US 6,603,397 B2

(12) United States Patent
Bronson (10) Patent No.: US 6,603,397 B2
(45) Date of Patent: Aug. 5, 2003

(54) CONTROL OF EMISSIONS BY DEVICES IN SENSITIVE ENVIRONMENTS (75) Inventor: Barry Bronson, Saratoga, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 44 days.

(21) Appl. No.: 09/805,253

(22) Filed: Mar. 14, 2001

(65) Prior Publication Data
US 2002/0130774 A1 Sep. 19, 2002

(51) Int. Cl.[7] ............................................. G08B 21/00
(52) U.S. Cl. ................. 340/540; 340/3.1; 340/5.1; 455/63; 455/404
(58) Field of Search ............................. 340/540, 565, 340/567, 657, 658, 659, 5.1, 3.1; 455/404, 405, 63

(56) References Cited

U.S. PATENT DOCUMENTS

| 4,028,725 | A |   | 6/1977  | Lewis ............................ 358/103 |
|-----------|---|---|---------|-------------------------------------------|
| 4,348,186 | A |   | 9/1982  | Harvey et al. .................. 343/44    |
| 4,479,784 | A |   | 10/1984 | Mallinson et al. .............. 343/43    |
| 4,634,384 | A |   | 1/1987  | Neves et al. ................... 434/44    |
| 5,071,209 | A |   | 12/1991 | Chang et al. ................... 359/19    |
| 5,103,306 | A |   | 4/1992  | Weiman et al. ................. 358/133   |
| 5,136,675 | A |   | 8/1992  | Hodson ......................... 385/116   |
| 5,320,534 | A |   | 6/1994  | Thomas ......................... 434/44    |
| 5,422,653 | A |   | 6/1995  | Maguire, Jr. .................... 345/9    |
| 5,442,805 | A | * | 8/1995  | Sagers et al. ................. 455/33.1   |
| 5,579,026 | A |   | 11/1996 | Tabata ........................... 345/8    |
| 5,625,364 | A | * | 4/1997  | Herrick et al. ................ 342/449   |
| 5,670,970 | A |   | 9/1997  | Yamazaki ....................... 345/8    |
| 5,673,059 | A |   | 9/1997  | Zavracky et al. ............... 345/8    |
| 5,726,670 | A |   | 3/1998  | Tabata et al. ................... 345/7    |
| 5,751,272 | A |   | 5/1998  | Silverbrook et al. .......... 345/149    |
| 5,757,424 | A |   | 5/1998  | Frederick ...................... 348/218   |
| 5,805,136 | A |   | 9/1998  | Silverbrook et al. .......... 345/149    |
| 5,808,589 | A |   | 9/1998  | Fergason ......................... 345/8    |
| 5,808,594 | A |   | 9/1998  | Tsuboyama et al. ............ 345/89     |
| 5,856,803 | A | * | 1/1999  | Pevler ............................ 342/13  |
| 5,917,460 | A |   | 6/1999  | Kodama ......................... 345/8    |
| 5,991,614 | A | * | 11/1999 | Oura ............................ 455/404  |
| 6,011,973 | A | * | 1/2000  | Valentine et al. ............. 455/456    |
| 6,101,038 | A |   | 8/2000  | Hebert et al. ................. 359/618   |
| 6,115,007 | A |   | 9/2000  | Yamazaki ........................ 345/7    |
| 6,122,486 | A | * | 9/2000  | Tanaka et al. .................. 455/68    |
| 6,124,843 | A |   | 9/2000  | Kodama ....................... 345/145    |
| 6,124,954 | A |   | 9/2000  | Popovich et al. .............. 359/13    |
| 6,140,980 | A |   | 10/2000 | Spitzer et al. ................... 345/8   |
| 6,188,883 | B1| * | 2/2001  | Takemura .................... 455/411     |
| 6,222,458 | B1| * | 4/2001  | Harris ........................ 340/686.6 |
| 6,230,017 | B1| * | 5/2001  | Andersson et al. ........... 455/456     |
| 6,343,212 | B1| * | 1/2002  | Weber et al. ................. 455/404    |
| 6,343,213 | B1| * | 1/2002  | Steer et al. .................. 455/411   |

* cited by examiner

Primary Examiner—Toan N Pham (57) ABSTRACT

A control device controls undesirable emissions from devices in an environment by transmitting signals to devices in the environment. The signals can be either control signals that require the devices in the environment to operate at a reduced functionality, or warning signals indicating an acceptable level of functionality for the devices. The levels of functionality for the devices are chosen to correspond to desired emission levels by the devices in the environment. The control device utilizes a transmitting device to transmit the signals to devices in the environment, and can include sensors to detect conditions within the environment. Another embodiment of the invention uses a control device as a relay for communication signals between devices within the environment and signal sources outside of the environment. In serving as a relay for communications signals, the control device maintains and controls the communication signals, and the control device can also include control signals and warning signals within the communications to the devices in the environment.

43 Claims, 4 Drawing Sheets

CONTROL OF EMISSIONS BY DEVICES IN SENSITIVE ENVIRONMENTS

BACKGROUND OF THE INVENTION

1. Field of the Invention

The present invention relates to the control of emissions by devices in sensitive environments. More particularly, the present invention relates to controlling emissions by transmitting signals to devices that indicate levels of functionality of devices.

2. Related Art

There are currently a large number of devices that generate emissions having deleterious effects in the area surrounding the devices (or, the "environment"). For example, mobile telephones, portable (or, "laptop") computers, radios, hand held organizers, and similar devices commonly emit audible noises that persons in the environment may find unpleasant or distracting. These types of devices also emit electromagnetic radiation that may negatively affect electronic devices in the environment.

One conventional solution to the above problem is to notify, by posted warning or by personal notification, the user of a device that the device must be deactivated while in the environment. Airline flight crews use this technique in order to minimize the electromagnetic radiation emitted by devices such as mobile telephones, portable computers, radios, etc. These devices all generate electromagnetic radiation, some in the form of radio frequency (RF) noise, that may affect an aircraft's navigation, control, and communication systems. The airline flight crew must therefore notify the users of such devices that they must deactivate them while on the aircraft, or that they must deactivate them during certain phases of the flight, such as takeoff, climb, landing, etc.

While deactivating all devices on an aircraft eliminates emissions from the devices, the conventional solution relies on the device users' compliance with the flight crew's orders. This is undesirable because it may be difficult for the flight crew to determine whether all device users are actually in compliance. Also, some device users may mistakenly believe that they have complied with the orders, while their devices continue to generate emissions. For example, a mobile telephone in an inactive state may continue to transmit a signal notifying nearby base stations of its location (known as "polling"), generating RF emissions in the process.

While it is possible for the flight crew to ensure compliance by all passengers, it is time-consuming for the flight crew to thoroughly instruct the passengers as to what devices must be deactivated and how they must be deactivated. In addition, the requirement for devices to be deactivated is inconvenient to the passengers.

A similar problem exists in public places such as restaurants, theaters, train cars, and similar environments, in which either audible noises or electromagnetic radiation emissions from devices are undesirable. The common solution to this problem is to post a notice requiring that certain devices not be used in the environment. For example, many restaurants post such notices forbidding the use of mobile telephones within the restaurant. This conventional solution is unsatisfactory because it relies on the users of the devices to comply with the notice, and it requires monitoring to ensure compliance.

An alternative conventional solution is to insulate the environment to electromagnetic energy. This solution renders mobile telephones, radios, etc. inoperative because they cannot receive signals from outside signal sources such as base stations, telecommunication satellites, radio transmitters, etc.

This conventional solution is effective in preventing both audible and electromagnetic emissions from mobile telephones, radios, etc. in the environment. However, preventing the use of these devices in the environment is inconvenient to users of the devices. Further, insulating the environment has no effect on devices that do not communicate with signal sources outside of the environment. In addition, insulating the environment to outside communications may prevent a desired use of a device, such as the use of a mobile telephone to place an emergency call.

There is therefore a need for an effective method of controlling emissions from devices within an environment, that does not unnecessarily inconvenience device users. There is also a need for an apparatus capable of effectively controlling emissions from devices, without unnecessary inconvenience to device users.

SUMMARY OF THE INVENTION

According to a first aspect of the present invention, the disadvantages of conventional solutions are overcome, and other advantages are achieved, by using a control device to transmit signals to one or more devices in the environment, the signals indicating a level of functionality required for the devices in the environment. The control device selects a level of functionality for each device that results in an acceptable level of emissions from each device while it is in the environment.

According to the first aspect, the control device controls the functionality of devices in an environment so that emissions from the devices are maintained at an acceptable level. In addition, depending upon the conditions within the environment, the control device can either increase or decrease the levels of functionality of devices within the environment. This aspect ensures that emission levels are maintained at an acceptable level without unnecessarily inconveniencing device users.

According to a second aspect of the present invention, a control device comprises a controller, an internal transmitting device, and an external transmitting device. The internal transmitting device receives communication signals from devices in the environment, and the communication signals are transmitted outside of the environment by the external transmitting device. The external transmitting device also receives communication signals from external signal sources, these communication signals being transmitted to a corresponding device by the internal transmitting device.

According to the second aspect, the controller maintains and controls communications between the devices in the environment and the external signal sources. The control device can also include control signals and warning signals within the communications to the devices in the environment, so that emissions from the devices are maintained at an acceptable level. A further advantage is that transmit power levels for the devices in the environment may be reduced, because the transmissions from the devices need only reach the internal transmitting device within the environment.

Other aspects and advantages of embodiments of the invention will be discussed with reference to the drawing figures and to the detailed description of preferred embodiments.

DETAILED DESCRIPTION OF PREFERRED EMBODIMENTS

A device and a method for controlling emissions according to the present invention will be described below byway of preferred embodiments and with reference to the accompanying drawings.

Figure 1:
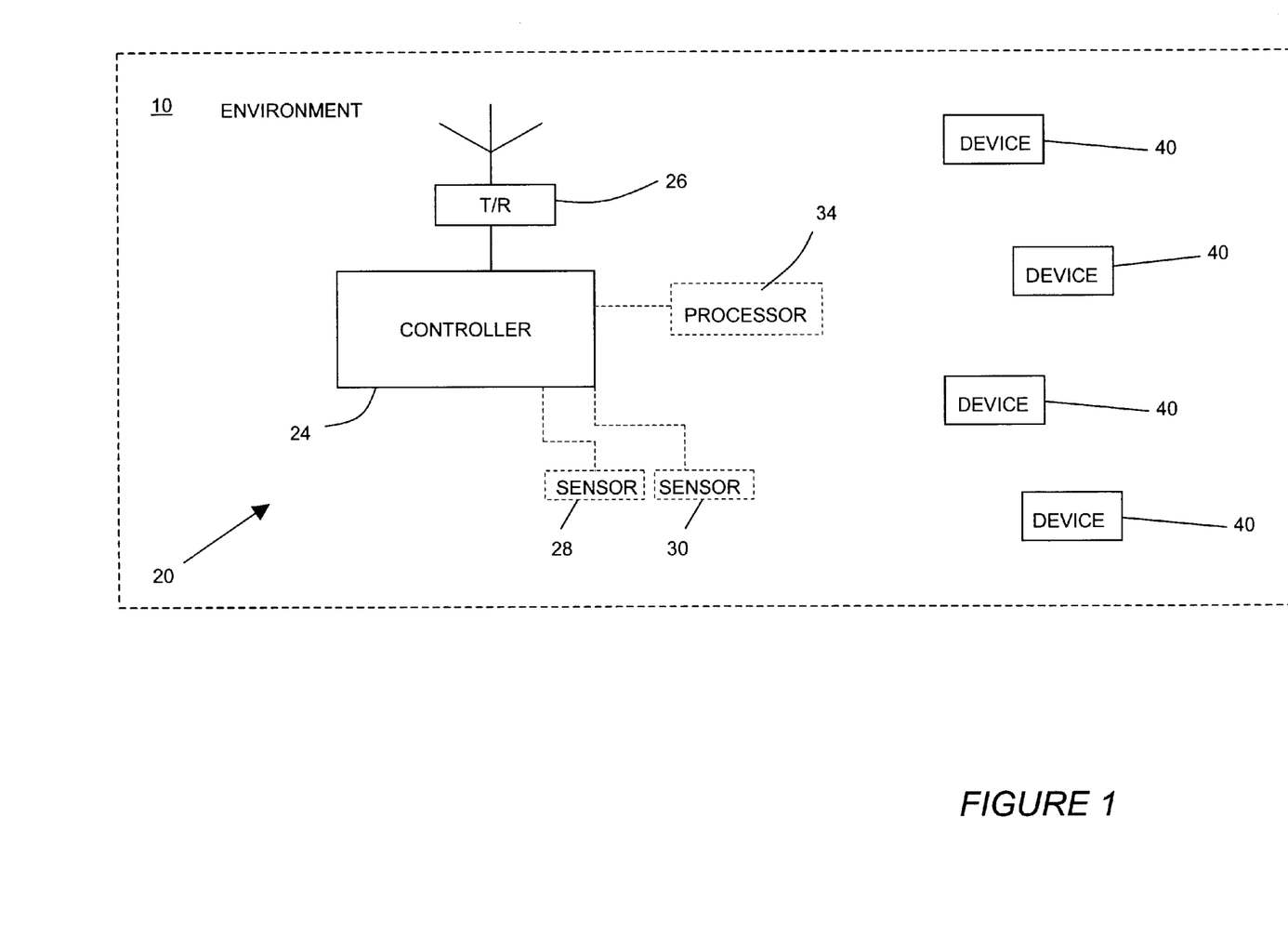
FIG. 1 is a schematic block diagram of a control device according to an embodiment of the present invention.

FIG. 1 is a schematic block diagram of a control device according to an embodiment of the present invention. In FIG. 1, a control device 20 is disposed in an environment 10 for controlling emissions from devices 40.

The control device 20 is comprised of a controller 24, a transmitting device 26, and optional sensors 28, 30 (shown in dotted lines in FIG. 1). The controller 24 is in communication with the transmitting device 26 so that signals from the controller 24 can be transmitted within the environment 10 by the transmitting device 26. The controller 24 may also be in communication with a processor 34 within the environment 10 (shown in dotted lines in FIG. 1). The controller 24 may be a central processing unit (CPU), any processor-based unit, or any other component for controlling the transmitting device 26.

The devices 40 within the environment 10 are devices that generate emissions such as electromagnetic radiation or audible noises. The devices 40 may be user-operated, or they may be unattended devices within the environment 10. Depending upon the nature of the environment 10, certain emissions from the devices 40 may be detrimental to the operation of equipment in the environment 10, or, certain emissions may be unpleasant to persons within the environment. The control device 20 therefore transmits control signals to the devices 40 that, for example, require the devices 40 to generate a warning to warn the users of one or more devices 40 of the emission requirements for the environment 10, or, that require one or more devices 40 to operate at a reduced functionality. The reduced functionality for a device 40 is selected so as to result in a corresponding reduction in emissions from the device 40. Four devices 40 are illustrated for illustrative purposes only, and the control device 20 can operate to control any number of devices.

For the purposes of this specification, the term "functionality" in general refers to one or more operating characteristics of a device 40. Functionality can be, for example, a processing power for a device 40, the amount of electrical power consumed by a device 40, volume levels for speakers in a device 40, the amount of power devoted to a visual display of a device 40, or any other performance characteristic that affects, directly or indirectly, the amount of emissions produced by a device 40. Functionality can also be an option or mode of operation for a device 40. For example, zero functionality might require deactivation of a device 40. Other functionalities include ring options (e.g. vibration, audible) for mobile telephones, polling frequency for mobile telephones, send and receive capabilities for devices capable of two-way communications, and other functionalities. The level of functionality of a device can be construed to indicate a single functionality for a device, or to indicate a combination of two or more discrete functionalities.

The nature of the environment 10 determines which emissions from the devices 40 are to be controlled by the control device 20, which in turn dictates which functionality or functionalities of the devices 40 must be reduced. For example, in restaurants, theaters, meeting rooms, trains, airplanes, and other public places, people generally find unnecessary noise to be distracting and unpleasant. In these types of environments, the control device 20 can transmit a control signal to the devices 40 in the environment requiring them to operate in a "quiet" mode. A "quiet" mode might require that devices such as mobile telephones use a silent ring (e.g. vibration ring), that devices such as portable computers (e.g. laptop computers) turn off speakers, that devices such as hand-held organizers turn off speakers, and that devices such as radios operate at a reduced, or no volume. The control device 20 might also require a total reduction in functionality (i.e. deactivation) for a device 40. For example, if all conversation via mobile telephone is undesirable in an environment 10, the control device 20 can deactivate mobile telephones in the environment 10.

As another example, in an environment 10 where RF radiation may potentially interfere with the operation of electronic equipment within the environment 10, the control device 20 can transmit a signal to devices 40 in the environment 10 requiring reduced functionality for the devices 40, such that they emit acceptable levels of RF radiation. For example, aircraft controls are sensitive to RF emissions during certain periods of operation, and a control device 20 can be included in an aircraft (the aircraft forming the environment 10) to control these emissions.

Other examples of devices 40 that emit RF radiation are portable computers, mobile telephones, hand held organizers, Internet appliances, wireless devices, and other devices that either actively transmit RF signals or emit RF radiation due to the consumption of electrical power. In the case of a mobile telephone, reduced functionality with respect to an RF-sensitive environment could include, for example, a reduced transmit power for the mobile telephone, the inability to initiate, receive or maintain calls, and restrictions (e.g. the reduction in frequency) on polling by the mobile telephone. Reduced functionalities for portable computers or hand held organizers could include, for example, a requirement for reduced processing power, reduction of visual display power, or any restriction that reduces the amount of RF radiation emitted by the device. If a device 40 is enabled for Internet or other forms of wireless communication, transmit power of the device can also be controlled.

The sensitivity of the environment 10 to emissions may vary with time and other factors. Optional sensors 28, 30 may be used to sense changing conditions of the environment 10 so that the controller 24 can determine an acceptable level of emissions for the environment 10. In an aircraft application, the sensors 28, 30 can be deployed within the aircraft to sense conditions such as takeoff state, landing state, altitude, open state of aircraft doors, airspeed, or other conditions. The controller 24 can also be linked to processor 34 of the aircraft, and can obtain all of the above condition information directly from existing aircraft sensors via the processor 34. As a further alternative, the controller 24 can comprise part of an existing aircraft processing system, the existing processing system being coupled to the transmitting device 26 to transmit control signals within the environment 10. In applications where the sensitivity of the environment 10 is relatively predictable, the controller 24 can control emissions according to a predetermined time schedule.

In order for communication to take place between the control device 20 and the devices 40, the devices 40 each include a receiver of some type in order to receive signals from the transmitter 26. The devices 40 also include some type of storage to store logic capable of recognizing and responding to control signals from the control device 20, so that the devices 40 can comply with the requirements of the control device 20. Many devices already include a transmitter and a receiver of some type, and would not require a separate receiver to receive signals from the transmitting device 26. For example, mobile telephones are equipped to transmit and receive RF signals. Therefore, mobile telephones need only be programmed to recognize an RF control signal from the control device 20. Many electronic devices such as portable computers, mobile telephones and hand held organizers are configured for wireless Internet service, or other wireless services. These devices could also be programmed to communicate with the control device 20, or to simply receive control signals from the control device 20.

The transmitting device 26 for transmitting signals within the environment 10 can be an RF transmitter or transmitter/receiver, an optical transmitter or transmitter/receiver, an audio transmitter or transmitter/receiver, or other communication devices. Combinations of the above transmitter/receiver types may also be used. In an environment 10 where many different types of devices 40 are operated by users, a plurality of transmitters or transmitter/receivers may be required or desired depending upon the receiver types present in the devices 40.

In an environment 10 where RF emitting devices 40 will be used, the transmitting device 26 can comprise an RF receiver for sensing RF energy in the environment 10. In this configuration, the transmitting device 26 acts as a sensor to determine whether RF levels in the environment 10 are acceptable. In the same environment 10, the transmitting device 26 can include an optical (including infrared), an RF, and an audio transmitter for transmitting control signals to the various devices 40 within the environment 10.

If the control device 20 is not intended to sense emissions in the environment 10, and is intended instead to control emissions based upon a condition or conditions of the environment 10 detected by the sensors 28 and 30, the transmitting device 26 can comprise a transmitter (e.g. RF, optical, audio) only. Alternatively, the control device 20 can transmit control signals based on a programmed time sequence, and a receiver would therefore not be required for the transmitting device 26.

The steps involved in a method of controlling emissions in an environment 10 where users may operate devices 40 will now be discussed with reference to FIGS. 1 and 2.

Figure 2:
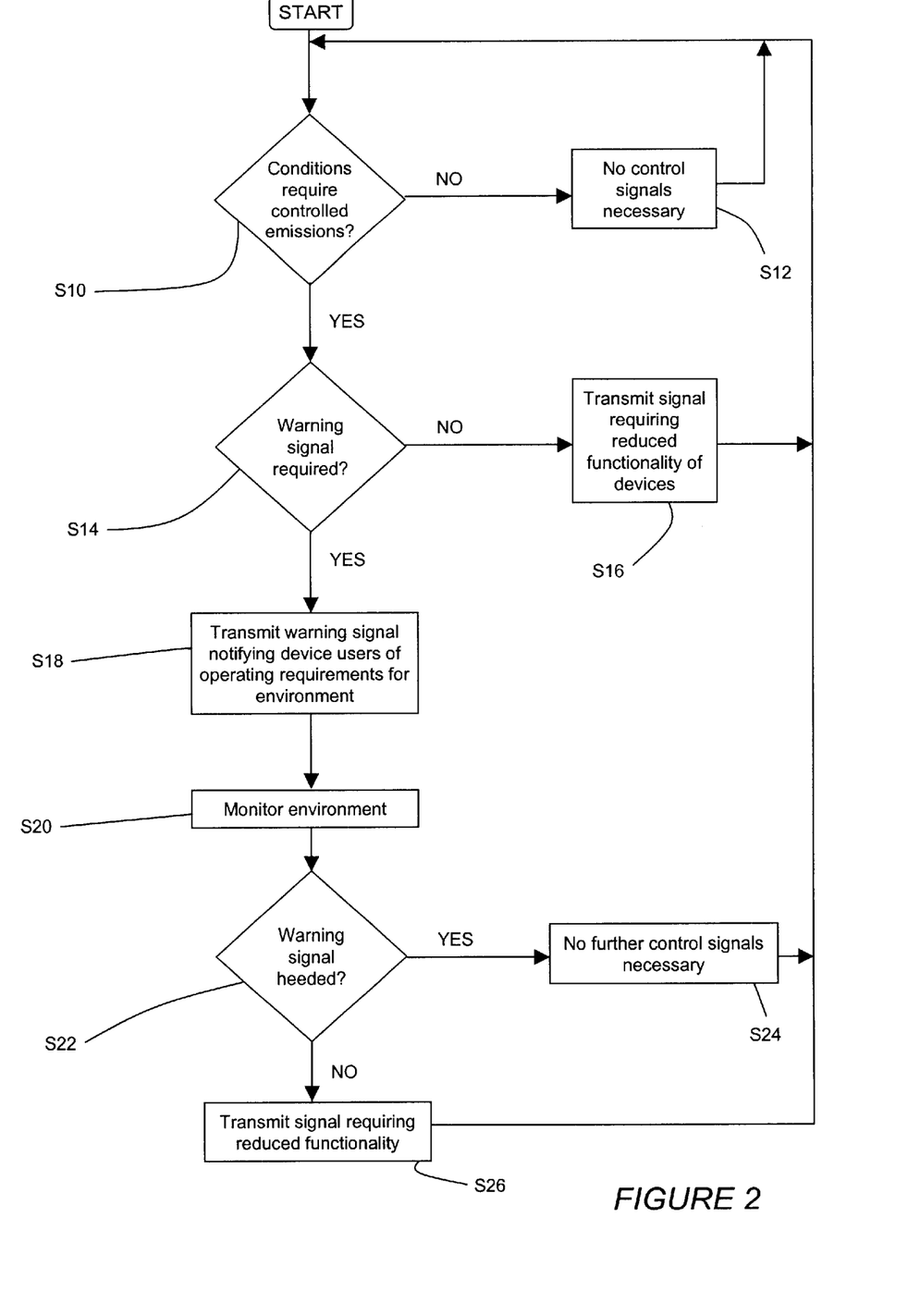
FIG. 2 illustrates a method of controlling device emissions according to an embodiment of the present invention.

FIG. 2 illustrates a method of controlling device emissions according to an embodiment of the present invention. This method may be implemented with software modules, for example, for controlling the operation of a processor within the controller 24, within hardware components, or a combination of software and hardware. At step S10, the controller 24 determines whether conditions within the environment 10 require control of emissions from the devices 40 in the environment 10. In an aircraft application, the controller 24 can be programmed to control emissions during takeoff, landing, climb, course changes, or other events, or at any time when aircraft systems may be sensitive to emissions from the devices 40. As another example, a controller 24 located within a restaurant (the restaurant forming the environment 10) can be programmed to control emissions during specific times of the day, or upon an operator activating the control device 20.

If the controller 24 determines that it is not necessary to control emissions in the environment 10, step S12 requires no control signals at that time. The output of step S12 returns to the input of step S10, indicating that the controller 24 periodically reevaluates whether emissions should be controlled at step S10.

If the controller 24 determines that emissions in the environment 10 must be controlled, in step S14, the controller 24 determines whether a warning signal is to be transmitted to the devices 40 in the environment 10. A warning signal may require a device 40 to generate a warning receivable by a user of the device, notifying the user of the emission requirements for the environment 10, and allows users of the devices 40 to voluntarily take corrective action before the control device 20 transmits a control signal requiring reduced functionality of their respective devices 40. The option of providing a warning signal can be programmed into the controller 24, or entered at an operator's discretion.

If no warning signal is to be transmitted, after determining that conditions within the environment 10 require controlled emissions in step S10, the control device 20 transmits a control signal requiring reduced functionality of the devices 40 in step S16. The control signal includes instructions for the devices 40 requiring them to reduce their functionality in order to satisfy the emission requirements of the environment 10. In order to avoid unnecessary or unexpected loss of data, loss of telephone or Internet connection, or other undesirable effect, the control signal to the devices 40 can include instructions for the devices 40 to undergo a shutdown sequence, allowing the device 40 to save data, close applications, or perform other shutdown operations. Alternatively, the control device 20 could transmit a signal to the devices 40, ordering the devices 40 to provide, for example, an audio or visual signal to the user, that inform the users that automatic reduction of functionality of their device 40 will begin within a certain time frame. This time allowance allows a mobile telephone operator to notify a caller that their call will end, a portable computer operator to save data, etc.

The output of step S16 is forwarded to step S10, where the controller 24 monitors for a change of conditions in the environment 10, which may require additional control signals to be transmitted to the devices 40 in the environment 10. The controller 24 periodically reevaluates whether emissions should be controlled at step S10.

Returning to step S14, if the controller 24 determines that a warning signal is to be transmitted, in step S18, the control device 20 transmits a warning signal to the devices 40. The warning signal can have many forms. For example, a warning signal to a portable computer in the environment 10 could require the personal computer to display a warning message on the portable computer's display screen, informing the user of the portable computer that she should, for example, reduce the processing power of the computer, turn off speakers of the computer, or, turn the computer off within a given time frame. The warning allows the user of the portable computer time to voluntarily comply with the emission requirements of the environment 10. In a mobile telephone, a warning signal from the control device 20 to the mobile telephone could interject (if the phone is actually carrying a call) a recorded voice message to the user of the mobile telephone, notifying the user that the mobile telephone should be shut down within a certain time period. Alternatively, the control device 20 could transmit a signal to the mobile telephone alerting the telephone of an impending requirement for reduced transmit power, non-audio ringing options, restricted polling, or other reduced functionality.

After the warning signal has been transmitted to the devices 40, in step S20 the control device 20 monitors the environment 10 to determine if users of the devices 40 in the environment 10 have complied with the warning signal sent in step S18. If the control device 20 determines that emissions levels are within acceptable limits in the environment 10, the method proceeds to step S24, which requires no further control signals. Step S20 also includes the control device 24 monitoring active transmissions from one or more devices 40, the transmissions from the devices 40 notifying the control device 20 of the status (i.e., whether or not the devices 40 have complied with the warning signal) of the devices 40. If emission levels in the environment 10 are not acceptable, in step S26 the control device 20 transmits a control signal requiring reduced functionality of the devices 40.

The control device 20 periodically monitors the level of emissions in the environment 10, and can transmit control signals to the devices 40 in order to compensate for excessive emission levels in the environment. Further, if emission levels are below an acceptable level, the control device 20 can transmit control signals notifying the devices 40 of relaxed functionality restrictions on the devices 40. Relaxing functionality restrictions ensures that device users are not unnecessarily inconvenienced while maintaining acceptable emission levels in the environment 10.

In the aviation application embodiment, the control device 20 periodically transmits control signals to the devices 40 during different stages of a flight. For example, aircraft sensitivity to emissions from the devices 40 may vary during passenger loading, taxiing, takeoff, climb, descent, and unloading of passengers, and the control device 20 may be programmed to update the control signals accordingly.

Figure 3:
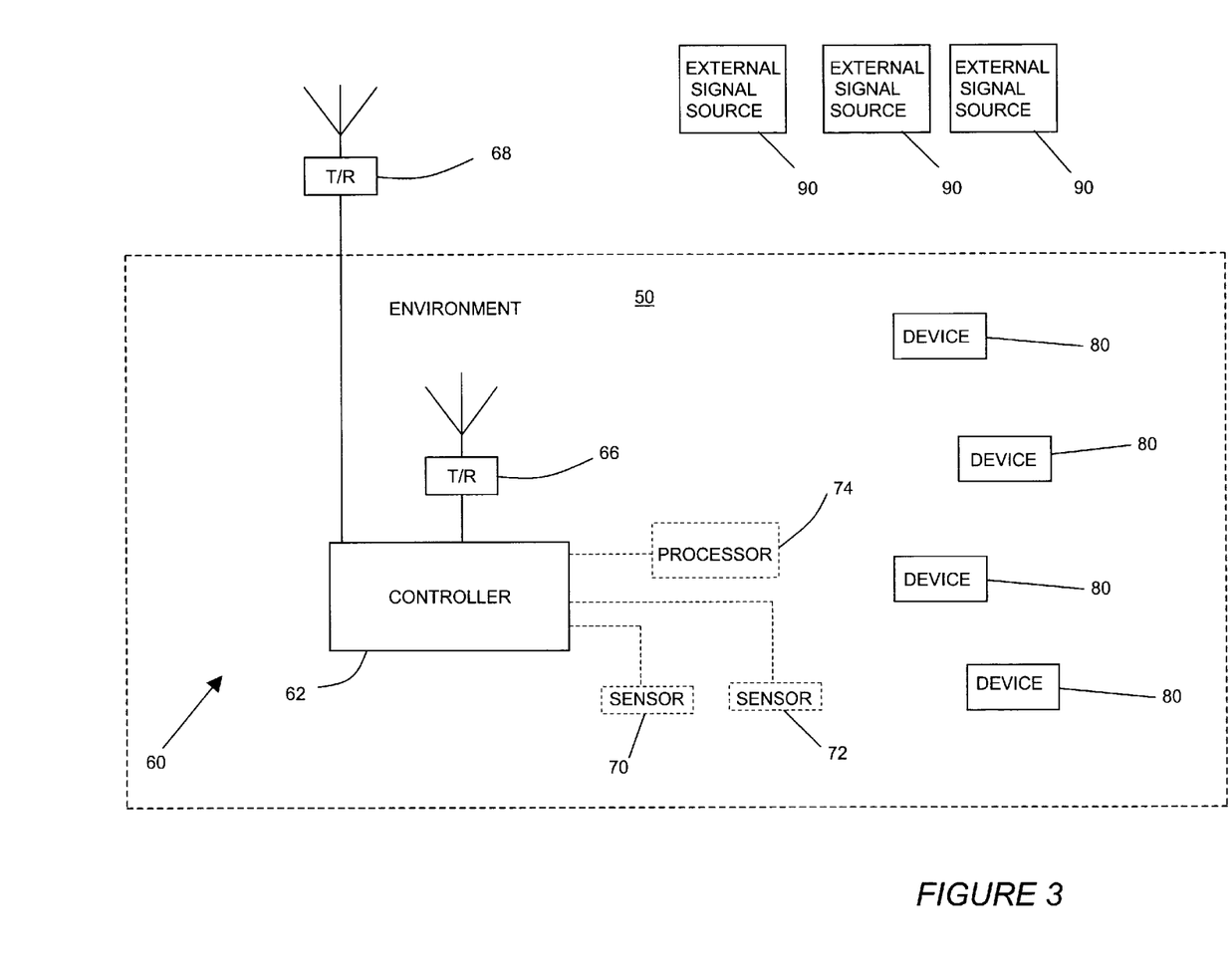
FIG. 3 is a schematic block diagram of a control device according to an alternative embodiment of the present invention.

FIG. 3 illustrates a control device 60 according to an alternative embodiment of the present invention. In FIG. 3, a control device 60 is disposed in a closed environment 50 for controlling emissions from devices 80. In the embodiment illustrated by FIG. 3, the environment 50 is closed to certain types of radiation. The control device 60 serves to relay information from external signal sources 90 outside of the closed environment 50 to the devices 80 within the environment 50. In addition, the control device 60 transmits control signals and/or warning signals to the devices 80 instructing them to operate at a reduced functionality under certain conditions.

The term "closed" environment is intended to be limiting only in that the closed environment 50 is substantially closed to certain types of radiation that are used by the devices 80 for communication with the external signal sources 90. For example, the closed environment 50 could be substantially closed with respect to RF signals, optical signals (including infrared), microwave signals, or other types of signals. The closed environment 50 allows the control device 60 to control communications between the devices 80 and the external signal sources 90, which in turn allows for control of the emissions from the devices 80.

The control device 60 is comprised of a controller 62, an internal transmitting device 66, an external transmitting device 68, and optional sensors 70, 72 (shown in dotted lines in FIG. 1). The controller 62 is in communication with the transmitting device 66 so that control signals from the controller 62 can be transmitted within the closed environment 50 by the transmitting device 66. The controller 62 can also be in communication with a processor 74 within the environment 50 (shown in dotted lines in FIG. 1). In addition, the controller 62 is in communication with the external transmitting device 68, which is located outside of the closed environment 50. The external transmitting device 68 provides for communication between the external signal sources 90 and the devices 80 in the environment 50. Examples of external signal sources 90 include communication satellites, base stations, or other types of signal sources. Three external signal sources 90 are shown for illustrative purposes only, and the control device 60 can operate with any number of external signal sources.

The devices 80 within the environment 10 are user-operated devices that generate emissions such as electromagnetic radiation or audible noise. The control device 60 controls emissions by the devices 80 in the closed environment 50 by relaying communication signals from the external signal sources 90 to the devices 80. In serving as a relay between the devices 80 and the external signal sources 90, the control device 60 can control emissions from the devices 80. For example, a mobile telephone located in the closed environment 50 could communicate with a base station outside the closed environment 50 via the control device 60. In addition to relaying communication signals between the mobile telephone and the base station, the control device 60 transmits control signals to the mobile telephone requiring the telephone to operate at a reduced functionality during selected times. The reduced functionality is selected for the telephone in order to reduce emissions from the mobile telephone to which the closed environment 50 is sensitive at the selected times.

The embodiment illustrated by FIG. 3 is discussed with reference to devices 80 that communicate with external signal sources 90. However, the control device 60 can also control devices that do not communicate with external signal sources. Specifically, the control device 60 can also function in the manner discussed with reference to FIGS. 1 and 2, as long as the devices include a receiver for receiving control signals from the internal transmitting device 66.

Figure 4:
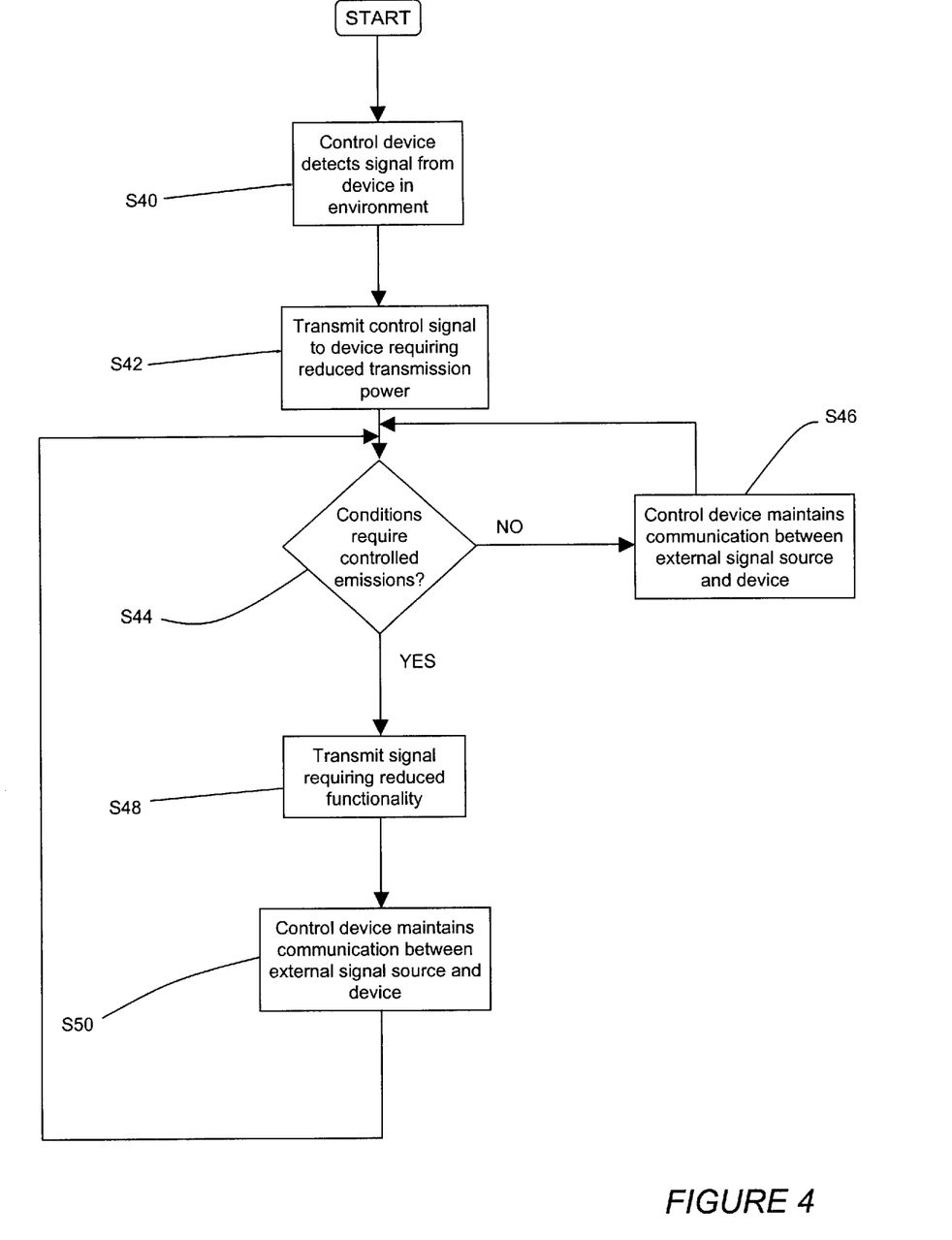
FIG. 4 illustrates a method of controlling device emissions according to an alternative embodiment of the present invention.

A method of controlling emissions according to an alternative embodiment of the present invention will now be discussed with reference to FIGS. 3 and 4. FIG. 4 illustrates the method of controlling device emissions according to the alternative embodiment of the present invention. This embodiment can be implemented within an aircraft, a rail car, or other moving environment, or in a restaurant, theater, or other stationary environment.

At step S40, the controller 62 detects a communication signal transmitted by a device 80 within the closed environment 50. The controller 62 is capable of determining what type of communication signal it has detected, and whether the device 80 intends to contact an external signal source 90 outside of the closed environment 50 with the signal. For example, TDMA, CDMA, or WCDMA communication signals, or signals conforming to other protocols received by the control device 60 through the internal transmitting device 66 would be appropriate for retransmission by the control device 60.

For the purposes of this specification, the term "communication signal" is used in general to indicate signals transmitted between the devices 80 and the external signal sources 90. A "communication signal" includes any particular type of signal, such as, for example, a voice communication signal, an RF signal, an optical signal, or any other electronic signal.

At step S42, the control device 60 transmits a control signal requiring the devices 80 to reduce their transmit power level. The devices 80 can successfully transmit at a significantly reduced transmit power level because they need only communicate with the relatively close internal transmitting device 66. The signals from the devices 80 are subsequently amplified in the control device 60 and retransmitted by the external transmitting device 68.

At step S44, the controller 62 determines whether conditions within the closed environment 50 require controlled emissions from the devices 80 in the closed environment 50. In an aircraft application, for example, the controller 62 can be programmed to control emissions during takeoff, landing, climb, course changes, or other events, or at any time when the aircraft control system is sensitive to emissions from the devices 80. As another example, a controller 62 located within a restaurant (the restaurant forming the closed environment 50) can be programmed to control device emissions during specific times of the day.

If the controller 62 in step S44 determines that controlled emissions are not required at a certain time, in step S46 the control device 60 maintains communications between the external signal sources 90 and the devices 80, without further reductions in functionality of the devices 80. For example, the control signal requiring reduced transmit power from step S42 may have sufficiently reduced the emissions within the closed environment 50 to an acceptable level. The control device 60 periodically monitors the conditions of the closed environment 50 to determine whether emissions must be controlled in step S44. The conditions of the closed environment 50 can be determined from the input from the optional sensors 70, 72, from the processor 74, or from emissions sensed by the internal transmitting device 66. Alternatively, the controller 62 can determine whether emissions must be controlled according to a predetermined time sequence.

Returning to step S44, if the controller determines that controlled emissions are required at a certain time, in step S48 the control device 60 transmits a signal requiring reduced functionality for the devices 80. In step S50, the control device maintains communications between the external signal sources 90 and the devices 80. If the closed environment 50 is particularly sensitive to emissions, however, the controller 62 can terminate communications between external signal sources 90 and the devices 80. The control device 60 periodically monitors the conditions of the closed environment 50 to determine whether emissions must be controlled in step S44.

If communication between a device 80 and an external signal source 90 is terminated, communication can be restored at step S40. The control device 60 can re-initiate communication by sensing a signal from the device 80, and retransmitting it via the external transmitting device 68. Also, if the control device 60 has communicated with a device 80, it can be programmed to recognize signals from external signal sources 90 intended for reception by that particular device 80. In this way, new communications (e.g., a call) can be initiated by external signal sources 90.

Note that the control device 60 can periodically monitor the emission level of the closed environment 50, and can transmit control signals to compensate for excessive emission levels in the closed environment 50. Further, if emission levels are below an acceptable level, the control device 60 can relax emission restrictions on the devices 80.

The methods described with reference to FIGS. 2 and 4 describe transmitting control signals to all devices within their respective environments when conditions require controlled emissions. However, it is within the scope of the disclosed embodiments to selectively transmit control signals and warning signals only to those devices that produce emissions above a threshold level, or that produce emissions of a certain type. The threshold level and the types of emissions that require control are selected according to the requirements of the environment.

Referring again to FIGS. 3 and 4, as an alternative to the control device 60 simply amplifying and repeating transmissions from the devices 80, the control device 60 can transmit a control signal to the device 80 requiring them to operate in a modified transmission mode. For example, mobile telephones could be instructed to operate within a modified frequency band that differs from the band in which they would customarily operate. The modified transmission mode would be selected so that emissions from the mobile telephone would have a lesser effect on the closed environment 50 than would occur if the mobile telephone operated within its conventional mode. The controller 62 would in turn convert transmissions in the modified transmission mode into conventional transmissions appropriate for reception by the external signal sources 90. Transmissions from the control device 60 to the devices 80 would also be modified to reduce the adverse effect of these transmissions on the closed environment 50.

While the present invention is described with reference to exemplary embodiments, it will be understood that many modifications will be readily apparent to those skilled in the art, and the present disclosure is intended to cover variations thereof.

What is claimed is:

1. A method of controlling emissions in an environment where a plurality of users may operate mobile devices that generate emissions, the method comprising:

determining a level of emissions for the environment;

transmitting at least one signal from a control device to at least one mobile device in the environment, the at least one signal indicating a level of functionality required for the mobile device in the environment based on the determining step;

transmitting a warning signal from the control device to said at least one mobile device to warn the user of the at least one mobile device;

monitoring with the control device the environment for compliance with the warning signal; and transmitting from the control device to said at least one mobile device a control signal requiring a reduction in functionality of said at least one mobile device if the control device detects the level of emissions is not in compliance with the warning signal.

2. The method of claim 1, comprising:

detecting at least one condition of the environment that affects the sensitivity of the environment to emissions; and generating the level of functionality indicated by the at least one signal as a function of the at least one condition of the environment.

3. The method of claim 2, wherein the environment is an aircraft, the at least one condition of the environment includes one or more of the following: takeoff state, landing state, altitude, open state of aircraft doors, or airspeed.

4. The method of claim 3, comprising:

receiving within the environment a communication signal transmitted by the at least one device in the environment; and maintaining a communication between the at least one device and a signal source external to the environment, the maintaining step comprising:

transmitting the communication signal outside of the environment.

5. The method of claim 4 wherein the maintaining step comprises:
receiving at least one communication signal from outside of the environment; and
transmitting the communication signal from outside of the environment into the environment.

6. The method of claim 5, comprising:
transmitting a warning signal to the least one device requiring the device to generate a warning receivable by a user of the device.

7. The method of claim 6, wherein the warning includes one or more of the following: an audible signal, or a message on a display screen.

8. The method of claim 1, comprising:
receiving within the environment a communication signal transmitted by the at least one device in the environment; and
maintaining a communication between the at least one device and a signal source external to the environment, the maintaining step comprising:
transmitting the communication signal outside of the environment.

9. The method of claim 8, the maintaining step comprising:
receiving at least one communication signal from outside of the environment; and
transmitting the communication signal from outside of the environment into the environment.

10. The method of claim 8, comprising:
transmitting a control signal to the at least one device requiring the device to operate in a modified transmission mode.

11. The method of claim 1, comprising:
transmitting a warning signal to the at least one device requiring the device to generate a warning receiveable by a user of the device.

12. The method of claim 11, wherein the warning includes one or more of the following: an audible signal, or a message on a display screen.

13. The method of claim 1 wherein said warning signal notifies the device of operating requirements for the environment.

14. The method of claim 1 wherein said warning signal requires the device to operate at a reduced functionality to allow the user of the device time to voluntarily take corrective action.

15. The method of claim 1 additionally comprising determining that the level of emissions for the environment is below an acceptable level; and transmitting from the control device to said at least one device a control signal notifying said at least one device of relaxed functionality restrictions.

16. The method of claim 1 additionally comprising determining that the level of emissions for the environment is below an acceptable level; and transmitting from the control device to said at least one device a control signal notifying said at least one device of relaxed functionality restrictions.

17. The method of claim 1 wherein said environment is selected from the group consisting of a restaurant, a theater, a meeting room, a train, an airplane, and a public place.

18. A method of controlling emissions in an environment where a plurality of users may operate mobile devices that generate emissions, the method comprising:
determining that emissions for an environment must be controlled;
transmitting a warning signal from the control device to at least one mobile device in the environment to notify said at least one mobile device of the emission-operating requirements for the environment;
monitoring with the control device the environment for compliance with the warning signal; and
transmitting from the control device to said at least one mobile device a control signal requiring a reduction in functionality of said at least one mobile device if the control device detects the level of emissions is not in compliance with the warning signal.

19. The method of claim 18 additionally comprising determining, prior to said transmitting the warning signal, that said at least one device is not complying with the emission.

20. The method of claim 19 additionally comprising transmitting, prior to said transmitting the warning signal, at least one signal from the control device to said at least one device in the environment in order to indicate a level of functionality required for said at least one device based on the determining step.

21. The method of claim 18 additionally comprising transmitting, prior to said transmitting the warning signal, at least one signal from the control device to said at least one device in the environment in order to indicate a level of functionality required for said at least one device based on the determining step.

22. The method of claim 18 wherein said warning signal requires the device to operate at a reduced functionality to allow the user of the device time to voluntarily take corrective action.

23. The method of claim 18 additionally comprising:
detecting at least one condition of the environment that affects the sensitivity of the environment to emissions; and
generating the level of functionality indicated by the at least one signal as a function of the at least one condition of the environment.

24. The method of claim 23, wherein the environment is an aircraft, the at least one condition of the environment includes one or more of the following: takeoff state, landing state, altitude, open state of aircraft doors, or airspeed.

25. The method of claim 18, comprising:
receiving within the environment a communication signal transmitted by the at least one device in the environment; and
maintaining a communication between the at least one device and a signal source external to the environment, the maintaining step comprising:
transmitting the communication signal outside of the environment.

26. The method of claim 25 wherein the maintaining step comprises:
receiving at least one communication signal from outside of the environment; and
transmitting the communication signal from outside of the environment into the environment.

27. The method of claim 25, comprising:
transmitting a control signal to the at least one device requiring the device to operate in a modified transmission mode.

28. The method of claim 18, comprising:
transmitting a warning signal to the least one device requiring the device to generate a warning receivable by a user of the device.

29. The method of claim 28, wherein the warning includes one or more of the following: an audible signal, or a message on a display screen.

30. The method of claim 18, comprising:

transmitting a warning signal to the least one device requiring the device to generate a warning receivable by a user of the device.

31. The method of claim 30, wherein the warning includes one or more of the following: an audible signal, or a message on a display screen.

32. The method of claim 18 wherein said environment is selected from the group consisting of a restaurant, a cheater, a meeting room, a train, an airplane, and a public place.

33. An environmental assembly comprising:

an environment;

at least one mobile device disposed in said environment and producing emissions when operated;

a control assembly disposed in said environment and comprising a transmitting/receiving device, a controller operatively connected to the transmitting/receiving device, and a processor operatively connected to the controller to obtain information regarding conditions of the environment; and the control assembly operatively: transmits a warning signal to said mobile device for notification of the emission-operating requirements for the environment, monitors the environment for compliance with the warning signal, and transmits to said mobile device a control signal requiring a reduction in functionality of said mobile device if the control assembly detects information regarding conditions of the environment is not in compliance with the emission-operating requirements.

34. The environmental assembly of claim 33 additionally comprising at least one sensor disposed in the environment and operatively connected to the controller for determining a condition of the environment.

35. The environmental assembly of claim 34 wherein said controller determines the levels of functionality based upon the condition of the environment.

36. The environmental assembly of claim 33 wherein said controller determines the levels of functionality based upon the condition of the environment.

37. The environmental assembly of claim 33 wherein the environment comprises an aircraft having said processor, the controller being operatively connected to the processor to obtain information regarding conditions of the aircraft.

38. The environmental assembly of claim 37 wherein the conditions include one or more of the following: takeoff state, taxi state, landing state, altitude, open state of aircraft doors, or airspeed.

39. The environmental assembly of claim 33 additionally comprising a second transmitting device operatively connected to the controller and disposed to transmit communication signals outside of the environment and to receive communication signals from outside of the environment.

40. The environmental assembly of claim 39 wherein said environment is selected from the group consisting of a restaurant, a theater, a meeting room, a train, an airplane, and a public place.

41. The environmental assembly of claim 33 wherein said environment is selected from the group consisting of a restaurant, a theater, a meeting room, a train, an airplane, and a public place.

42. An assembly for controlling emissions in an environment where a plurality of users may operate mobile devices that generate emissions, the assembly comprising:

means for determining that emissions for an environment must be controlled; and control means for:
(i) transmitting a warning signal to at least one mobile device in the environment to notify said at least one mobile device of the emission-operating requirements for the environment;
(ii) monitoring the environment for compliance with the warning signal; and
(iii) transmitting to said at least one mobile device a control signal requiring a reduction in functionality of said at least one mobile device if said determining means determines that emissions for the environment is to be controlled.

43. The assembly of claim 42 wherein said environment is selected from the group consisting of a restaurant, a theater, a meeting room, a train, an airplane, and a public place.

* * * * *